US 6,588,561 B1

(12) United States Patent
Fernandez

(10) Patent No.: US 6,588,561 B1
(45) Date of Patent: Jul. 8, 2003

(54) DOUBLE ACTING SYNCHRONIZER

(75) Inventor: Josevaldo Roberto Fernandez, Salto-Sp. (BR)

(73) Assignee: Eaton Corporation, Cleveland, OH (US)

( * ) Notice: Subject to any disclaimer, the term of this patent is extended or adjusted under 35 U.S.C. 154(b) by 21 days.

(21) Appl. No.: 10/023,605

(22) Filed: Dec. 17, 2001

(51) Int. Cl.[7] ............................................. F16D 23/06
(52) U.S. Cl. ............................. 192/48.91; 192/53.31; 192/53.341
(58) Field of Search ...................... 192/48.91, 53.31, 192/53.34, 53.341; 74/339

(56) References Cited

U.S. PATENT DOCUMENTS

| | | | |
|---|---|---|---|
| 5,544,727 A | 8/1996 | Braun | 192/48.91 |
| 5,664,654 A | * 9/1997 | Braun | 192/48.91 |
| 6,467,597 B1 | * 10/2002 | Fernandez | 192/53.31 |

FOREIGN PATENT DOCUMENTS

EP    1099870    5/2001    ........... F16D/23/06

* cited by examiner

Primary Examiner—Richard M. Lorence
(74) Attorney, Agent, or Firm—Paul S. Rulon; Kevin M. Hinman; Howard D. Gordon

(57) ABSTRACT

A synchronizer (18) includes cone clutch friction surfaces (24,48 and 26,50) for frictionally synchronizing gears (14, 16) to a shaft (12), and jaw clutch teeth (28,30) engagable with jaw teeth (36a,36b) defined on a shift sleeve (34) for positive connecting the gears to the shaft. A plurality of self-energizing/blocker members (62) transmit shift force applied to the shift sleeve and self-energizing force to friction rings (40,42) via blocker surfaces (44r,44s,44p,44q) defined by blocker members (44) that have opposite ends (44c,44d) attached to the friction rings. The blocker members also disengage the friction surfaces of one cone clutch prior to engagement of to the friction surfaces of the other cone.

16 Claims, 3 Drawing Sheets

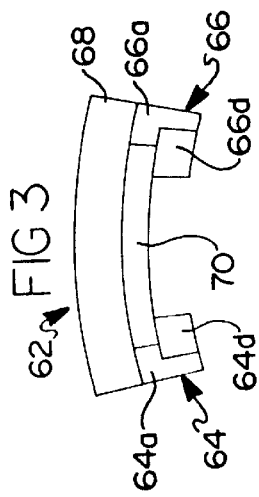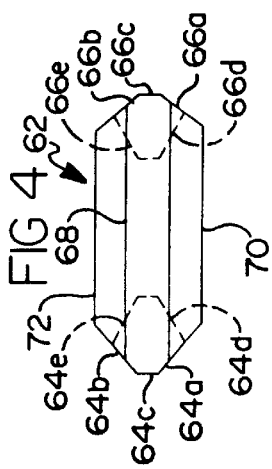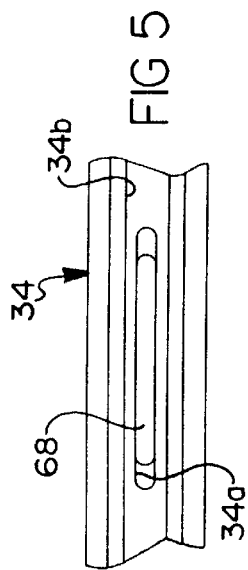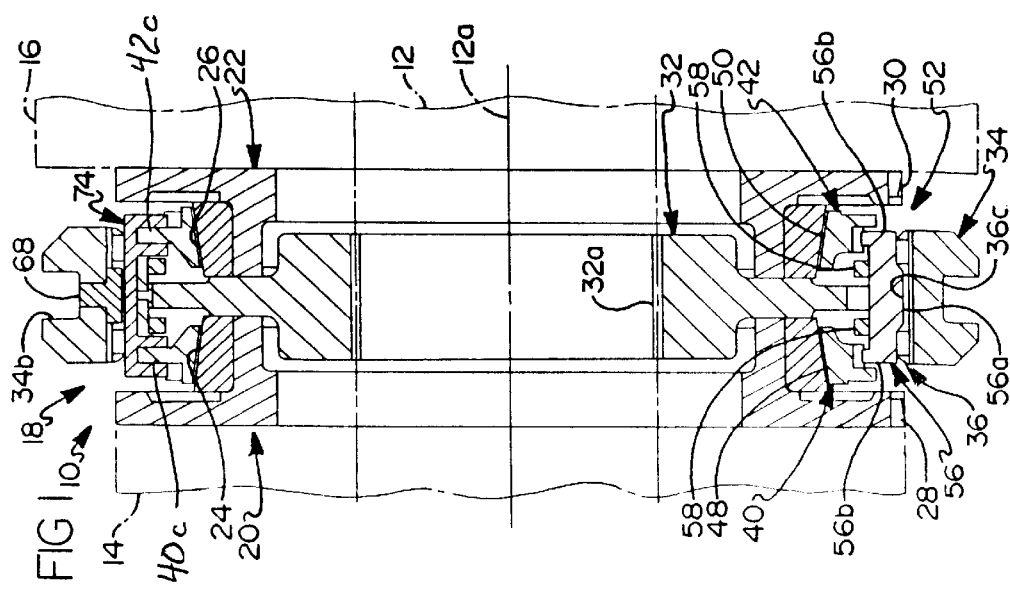

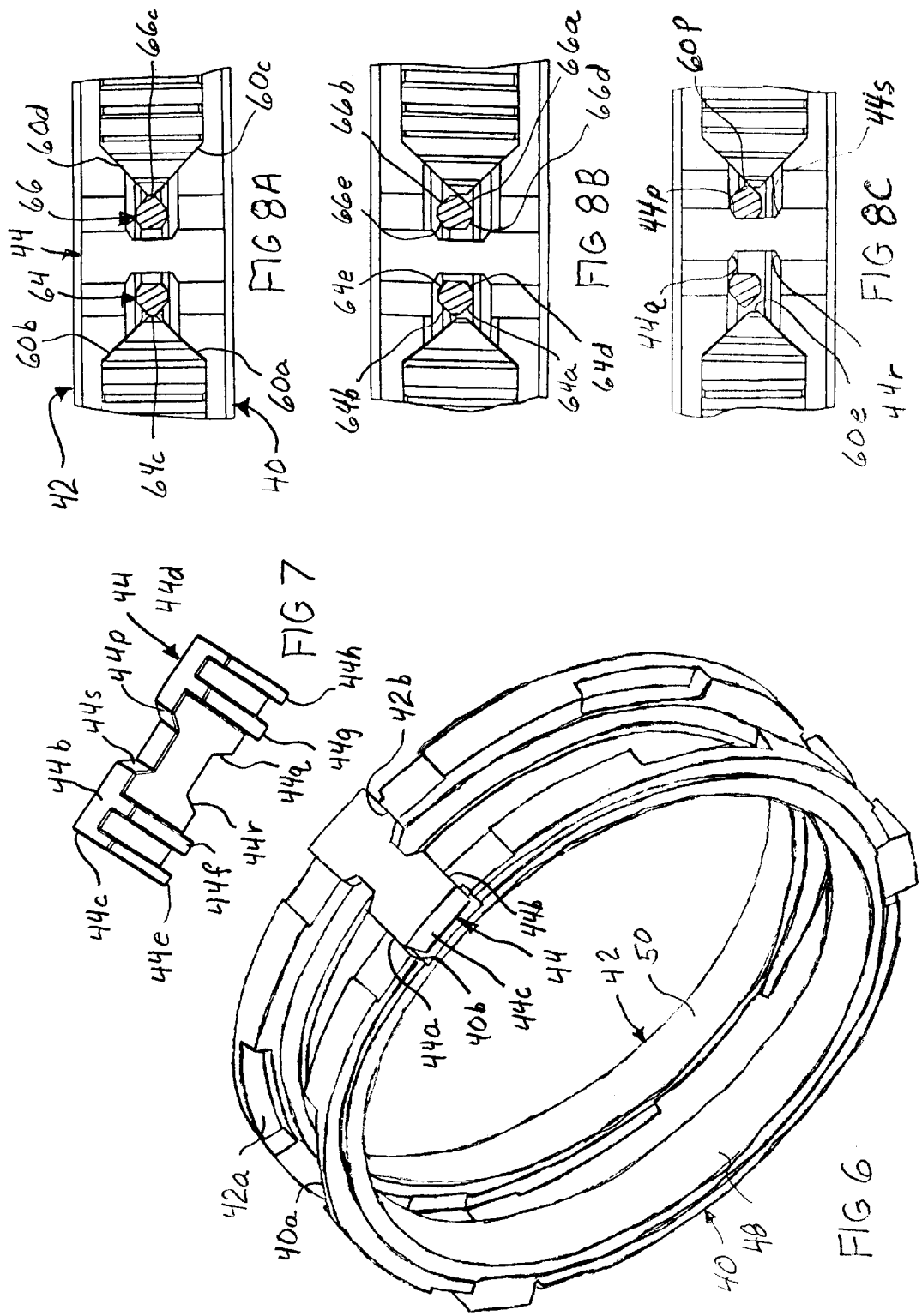

DOUBLE ACTING SYNCHRONIZER

CROSS-REFERENCE To RELATED APPLICATION

This application is related to U.S application Ser. No. 09/711,241, filed Nov. 9, 2000, now U.S. Pat. No. 6,647,597.

FIELD OF THE INVENTION

This invention relates to a double acting synchronizer.

BACKGROUND OF THE INVENTION

Synchronizers for use in multi-ratio transmissions are well known. Such synchronizers include pairs of friction and jaw members for respectively synchronizing and positive clutching axially spaced apart ratio gears to a shaft, a hub rotatably fixed to the shaft and having external spline teeth slidably receiving internal spline teeth of a shift sleeve, blocker surfaces for arresting engaging movement of the shift sleeve until synchronization is reached and for transferring a shift force from the shift sleeve to axially movable friction rings. Such synchronizers often include pre-energizer assemblies for effecting initial engagement the friction members in response to initial engaging movement of shift sleeve. It is also known that the shift time and/or shift effort required by a vehicle operator, i.e., force applied to a shift lever, may be reduced by use of a synchronizer of the self-energizing type. A synchronizer of the self-energizing type may be seen by reference to U.S. Pat. No. 5,544,727, which is incorporated herein by reference.

The synchronizer in U.S. Pat. No. 5,544,727 has blocker surfaces that move axially with the shift sleeve and into engagement with blocker surfaces formed with the axially movable friction rings. Manufacturing complexity and cost of such friction rings may be reduced by forming the blocker surfaces on separate blocker members that attach to the friction rings.

Further, when double acting synchronizers are shifted from an engaged position with one ratio gear to the other ratio gear, the friction clutch of the ratio gear being disengaged may remain engaged enough to continue to transmit torque after the engagement of the friction clutch of the gear being engaged, thereby tending to rotate the friction rings relative to each other with damaging forces. The separate blocker members herein may include features for ensuring timely disengagement of the friction clutch to be disengaged.

SUMMARY OF THE INVENTION

An object of this invention is to provide a synchronizer with improved blockers.

According to the invention, a double acting synchronizer selectively synchronizes and positively connects a shaft with either of axially spaced apart first and second drives disposed for relative rotation about an axis of the shaft and axially fixed relative thereto. The synchronizer comprises: A hub is affixed to the shaft concentric to the axis and disposed between the first and second drives. First and second jaw teeth are respectively affixed to the first and second drives. First and second friction surfaces are rotatably fixed respectively to the first and second drives. A shift sleeve is mounted for fixed rotation with and axial movement relative to the hub and has third and fourth jaw teeth that are respectively engagable with the first and second jaw teeth in response to a to-or-fro axial engaging movement of the shift sleeve from a neutral position by a shift force. First and second friction rings are respectively associated with the first and second drives and respectively have third and fourth friction surfaces that are respectively movable axially into engagement with the first and second friction surfaces for producing a synchronizing torque. A plurality of first blocker surfaces are engagable with a plurality of second blocker surfaces in response to the to-or-fro movement of the shift sleeve for preventing asynchronous engagement of the engagable jaw teeth and for transmitting the operator shift force across the engaged blocker surfaces to effect synchronizing engagement of the friction surfaces. The first blocker surfaces are defined by first member means extending radially inward from the shift sleeve and affixed for axial movement thereto. And an axially extending second member means defines the second blocker surfaces and has first and second ends respectively having first and second portions for transmitting the operator shift force to the first and second friction rings.

BRIEF DESCRIPTION OF THE DRAWINGS

The synchronizer of the invention shown in the accompanying drawings in which:

FIG. 1 is a sectional view of a double-acting synchronizer in a neutral position and disposed for rotation about the axis of a shaft;

FIGS. 3 and 4 are plan views of an enlarged self-energizing member of the synchronizer of FIGS. 1 and 2;

FIG. 5 is a plan view of a portion of the synchronizer of FIG. 1;

FIG. 6 is an enlarged perspective view of a friction ring and blocker assembly;

FIG. 7 is an enlarged perspective view of a blocker member in FIG. 6; and

FIGS. 8A–8C are schematic views of blocker and self-energizing operation of the synchronizer.

DETAILED DESCRIPTION OF THE DRAWINGS

Figure 2:
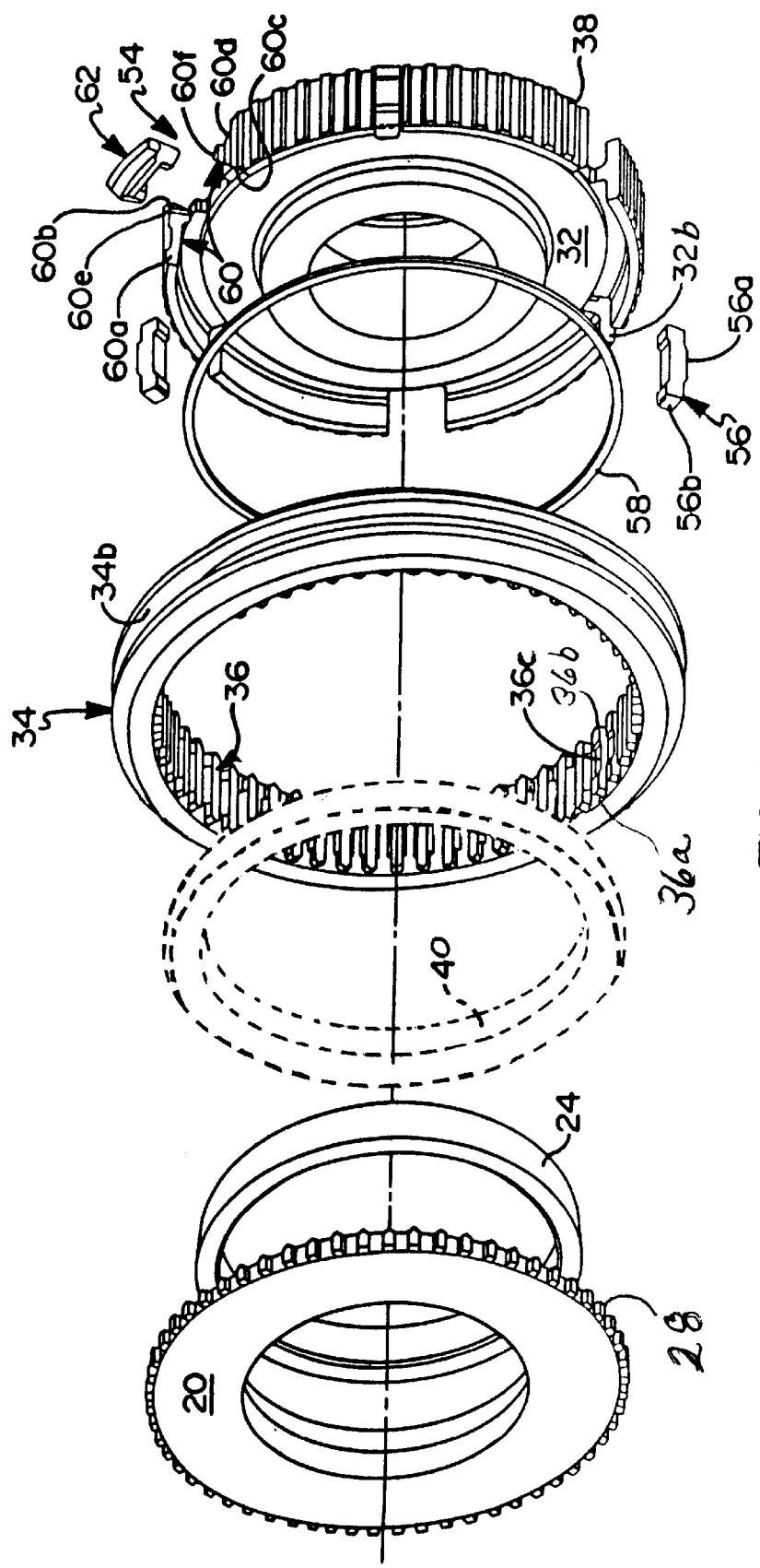
FIG. 2 is an exploded perspective view of portions of the synchronizer of FIG. 1.

The term "synchronizer" shall designate a clutch mechanism utilized to non-rotatably couple a selected ratio gear or drive to a shaft or drive by means of a positive clutch in which attempted engagement of the positive clutch is prevented until members of the positive clutch are brought to substantially synchronous rotation by a synchronizing friction clutch associated with the positive clutch. The term "self-energizing" shall designate a synchronizer which includes ramps or cams or the like to increase the engaging force of the synchronizing clutch in proportion to the synchronizing torque of the friction clutch.

Looking now at FIGS. 1–8, therein is shown a gear and synchronizer assembly which forms part of a multi-ratio change speed transmission. Assembly 10 includes a shaft or drive 12 shown in phantom lines and mounted for rotation about a central axis 12a, axially spaced apart gears or drives 14,16 also shown in phantom lines and supported on the shaft for rotation relative thereto, and a double-acting synchronizer 18. The gears are secured against axial movement relative to the shaft in known manner and one of the gears may be a reverse gear.

The synchronizer 18 includes annular drives 20,22 axially and rotatably affixed to gears 14,16 in known manner, gear friction surfaces 24,26 herein defined by rings affixed to drives 20,22 in known manner, spline or jaw teeth 28,30 herein integral with drives 20,22, a hub 32 axially and rotatably affixed at a central opening 32a thereof to shaft 12, a shift sleeve 34, internal spline teeth 36 defined on a central opening of sleeve 34 and in constant mesh with external spline teeth 38 (see FIG. 2) defined on the outer circumference of hub 32, friction rings 40,42, rigid blocker members 44, friction surfaces 48,50, pre-energizer assemblies 52, and self-energizing/blocker assemblies 54. Opposite ends of splines 36 define jaw teeth 36a,36b which mate respectively with jaw teeth 28,30 to positively clutch the gears to the shaft. Friction ring 40 is shown in phantom lines in FIG. 2 and in detail with friction ring 42 in FIGS. 1 and 6. Herein, the synchronizer includes three circumferentially spaced apart self-energizing/blocker assemblies 54 which cooperate with of blocker surfaces 44p–44s defined by each blocker member 44.

As is readily seen, friction surfaces 24,48 and 26,50 pair up to define friction clutches for synchronizing the gears to the shaft prior to engagement of the jaw teeth. Cone clutches are preferred; however, other types of friction clutches may be used. A wide range of cone angles may be used. The friction surfaces may be defined by any of several known friction materials affixed to the base member, e.g., pyrolytic carbon friction materials such as disclosed in U.S. Pat. Nos. 4,700,823; 4,844,218 and 4,778,548 may be used. These patents are incorporated herein by reference.

Spline teeth 36,38 have axially extending flank surfaces which continuously mate in close sliding relation so that there is relatively no rotation between shift sleeve 34 and hub 32. With reference to FIG. 2, the flank sides of spline jaw teeth 36 and of jaw teeth 28,30 are provided with an antibackout or locking angle features to prevent inadvertent disengagement of the teeth. Details of this feature may be seen by reference to U.S. Pat. No. 4,727,968 which is incorporated herein by reference.

The pre-energizer assemblies 52, which are known in the art, include three struts 56 disposed in axially extending slots 32b in hub 32, two c-shaped springs 58 biasing a portion 56a of each strut into a detent recess 36c in splines 36. The pre-energizer assemblies 52 resiliently position shift sleeve 34 in the neutral position shown in FIG. 1. Ends 56b of the struts are axially spaced between abutment surfaces 40a,42a (herein three) formed integral with friction rings 40,42.

When it is desired to couple either gear to the shaft, an appropriate and unshown shift mechanism is used. An example of such a mechanism is disclosed in U.S. Pat. No. 4,920,815 and incorporated herein by reference. The shift mechanism includes an unshown shift fork received in an annular recess 34b and operative to move shift sleeve 34 axially along the axis of shaft 12 either left to couple gear 14 or right to couple gear 16. The shift mechanism may be manually moved to or fro by an operator through a linkage system, may be selectively moved by an actuator, or may be moved by means which automatically initiate shift mechanism movement and which also controls the magnitude of the force applied by the shift fork. When the shift fork is moved, pre-energizer assemblies 52 apply a pre-energizer force proportional to the shift force applied to the shift sleeve. Whether manually or automatically applied, the shift force is applied to the shift sleeve in an axial direction toward the gear to be engaged. The pre-energizer force, depending on the direction of shift sleeve movement by the shift force, moves either friction surface 48 or 50 into initial engagement with its associated friction surface to clock the associated friction ring to a position relative to hub 32 for positioning the self-energizing/blocker assemblies 54 in a manner explained hereinafter.

Self-energizing/blocker assemblies 54 each comprise one of blocker members 44, self-energizing means 60, and a self-energizing/blocker member 62. Each blocker member 44, which extends axially and rigidly between friction rings 40,42, includes circumferentially oppositely facing sides 44a, 44b snugly received in recesses 40b, 42b in friction rings 40,42 for maintaining the rotational relation therebetween and ends 44c, 44d. The ends include axially spaced apart and radially inwardly extending portions 44e, 44f and 44g, 44h snugly and respectively receiving ribs 40c, 42c defined by friction rings 40, 42. The sides include blocker surfaces 44p, 44q, 44r, 44s. Each self-energizing means 60 include self-energizing pairs of ramps or boost surfaces 60a, 60b and 60c, 60d extending oblique to the rotational plane of hub 32 and defined on circumferentially opposite ends of recesses in the outer circumference of the hub. Each pair of ramp surfaces is respectively separated by non-boost surfaces 60e, 60f extending perpendicular to the rotational plane of the hub. Each self-energizing/blocker member 62 includes circumferentially spaced apart and radially inwardly extending post members 64, 66 slidably embracing the sides of blocker member 44 and rigidly joined together by a circumferentially extending member 68 received in a circumferentially extending slot 34a in shift sleeve 34. Arcuate flanges 70,72 extend axially from portion 68. Slot 34a allows limited circumferential movement of member 62 therein relative to the shift sleeve and prevents axial movement therein relative to the shift sleeve. Flanges 70,72 slidably bear against mating surfaces of shift sleeve 34 and provide added support for resisting wear of circumferentially extending portion 68 and slot 34a. End portion 64 includes self-energizing ramp surfaces 64a,64b which respectively react against surfaces 60b,60a when shift sleeve 34 is moved axially left or right, a non-boost surface 64c which reacts against the surface 60e when the synchronizer clutch mechanism 18 is in the neutral position of FIG. 1, and blocker surfaces 64d,64e which respectively react against blocker surfaces 44r,44q of blocker member 44. In a like manner, end portion 66 includes self-energizing ramp surfaces 66a,66b for respectively reacting against the surfaces 60d,60c, a non-boost surface 66c for reacting against the surface 60f, and blocker surfaces 66d,66e for respectively reacting against the blocker surfaces 44s,44p. The engaged position of non-boost surfaces 60e,60f,64c,66c prevents unwanted activation of the self-energizing ramps in the event there is some amount of torque produced by one of the cone clutches while the synchronizer is in the neutral position, e.g., viscous shear of oil between the cone clutch friction surfaces may produce a torque that could otherwise activate the ramps. Engagement of the self-energizing ramp surfaces produces an additive axial self-energizing force that is transmitted to the friction surfaces via the blockers and in the direction of the shift force.

Blocker member portions 44f, 44g are for transferring operator shift force and self-energizing force to friction rings 40, 42, respectively. Portions 44e, 44h are for disengaging the friction surface of one friction ring prior to engagement of the friction surface of the other friction ring. This may happen when the shift sleeve is moved by the shift force from a position having the jaw teeth thereof engaged with the jaw teeth affixed to one gear toward a position for engaging the jaw teeth thereof with the jaw teeth of the other gear. Positive disengagement of one friction clutch prior to engagement of the other friction clutch prevents simultaneous engagement and torque transmission by both clutches which tends to rotate the friction rings relative to each other with damaging forces and with accelerated wear of the friction surfaces. Such simultaneous engagement and torque transmission is particularly damaging when one of the gears is a reverse gear. If positive disengagement of one or both of the friction clutches is not preferred one or both of portions 44e,44h may be omitted or positioned to allow free play relative to ribs 40c, 42c.

At the start of a shift from neutral, the blocker surfaces of blocker member 44 may be circumferentially positioned any place between post members 64,66. Initial rightward axial movement of shift sleeve 34 by the shift force is transmitted by the pre-energizer assembly struts 56 to friction ring 42 via abutment surfaces 42a to effect initial frictional engagement of movable friction surface 50 with gear friction surface 26. The initial engagement force on the friction surface is, of course, a function of the force of springs 58 and the angles of the walls of detent recess 36c. The initial engagement of friction surface 50 causes an initial synchronizing torque to be transmitted across cone surfaces 50,26, assuming an asynchronous condition exists. This initial torque rotates friction ring 42 and blocker member 44 relative to the hub and shift sleeve enough to position blocker surfaces 66e,44p for engagement thereby allowing transmission of the shift force directly across the engaged blocker surfaces. When these blocker surfaces are engaged, the shift force applied to self-energizing member 62 from shift sleeve 34 is transmitted to friction ring 42, via blocker members 44 thereby engaging friction surfaces 26,50 with full shift force for producing a synchronizing torque proportional to the shift force.

Looking now at the schematics of FIGS. 8A–8C, FIG. 8A illustrates a neutral position of the synchronizer components having non-boost surfaces 60e,64c and 60f, 66c in position for engagement. FIG. 8B illustrates initial movement of self-energizing/blocker member posts 64,66 from the neutral position in response to axial movement of shift sleeve 34 toward jaw teeth 30 affixed to gear 16. The components in FIG. 8B may be considered to be in a pre-pre-energized position wherein the pre-energizer assemblies have not moved friction ring surface 50 enough toward engagement with friction surface 26 to develop an initial synchronizing torque to rotate friction ring 42 relative to the hub for positioning blocker surfaces 44p, 66e for engagement. FIG. 8C illustrates a blocking/self-energizing position of the components wherein initial synchronizing torque has rotated friction ring 42, blocker member 44 and self-energizing/blocker member 62 to a position having blocker surfaces 44p, 66e engaged and self-energizing ramps 60d, 66a engaged. In this engaged position full operator shift force and self-energizing force are transmitted to the engaged friction surfaces via the engaged blocker surfaces. Operation of the other blocker surfaces and boost ramps is analogous to the of blocker surfaces 44p,66e and boost ramps 60d,66a. A more detailed description of the operation of the blocker surfaces and boost ramps may be obtained by reference to previously mentioned U.S. Pat. No. 5,544,727. If self-energizing ramp surfaces 60d,66a were normal to the plane of rotation of hub 32, no self-energizing forces would be produced. Also, since blocker surfaces 44p,66e are oblique to the plane of rotation, they in addition to preventing asynchronous engagement of jaw teeth 36b and transmitting the shift and self-energizing forces to friction surfaces 26,50, also produce a counter torque or unblocking torque counter to the synchronizing torque but of lesser magnitude during asynchronous conditions. As substantial synchronism is reached, the synchronizing torque drops below the unblocking torque, whereby the blocker surfaces move out of engagement to allow continued axial movement of the shift sleeve and engagement of jaw teeth 36b with jaw teeth 30.

A double acting synchronizer with improved blockers has been disclosed. The synchronizer may include self-energizing. The following claims are intended to cover the inventive portions of the disclosed synchronizer.

What is claimed is:

1. A double acting synchronizer for selectively synchronizing and positively connecting a shaft with either of axially spaced apart first and second drives disposed for relative rotation about an axis of the shaft and axially fixed relative thereto; the synchronizer comprising:

a hub affixed to the shaft concentric to the axis and disposed between the first and second drives;

first and second jaw teeth respectively affixed to the first and second drives;

first and second friction surfaces rotatably fixed respectively to the first and second drives;

a shift sleeve mounted for fixed rotation with and axial movement relative to the hub and having third and fourth jaw teeth respectively engagable with the first and second jaw teeth in response to a to-or-fro axial engaging movement of the shift sleeve from a neutral position by a shift force;

first and second friction rings respectively associated with the first and second drives and respectively having third and fourth friction surfaces respectively movable axially into engagement with the first and second friction surfaces for producing a synchronizing torque;

a plurality of first blocker surfaces engagable with a plurality of second blocker surfaces in response to the to-or-fro movement of the shift sleeve for preventing asynchronous engagement of the engagable jaw teeth and for transmitting the operator shift force across the engaged blocker surfaces to effect synchronizing engagement of the friction surfaces, the first blocker surfaces defined by first member means extending radially inward from the shift sleeve and affixed for axial movement thereto; and an axially extending second member means defining the second blocker surfaces and having first and second ends respectively having first and second portions or transmitting the operator shift force to the first and second friction rings.

2. The double acting synchronizer of claim 1, wherein:

the first member means includes a circumferentially spaced apart pair of posts defining the first blocker surfaces and second member means includes circumferentially oppositely facing sides defining the second blocker surfaces.

3. The double acting synchronizer of claim 1, wherein:

the posts are mounted for axial movement with and limited rotation relative to the shift sleeve, the posts include first self-energizing means engagable with second self-energizing means defined by the hub and operative when engaged to react the synchronizing torque for producing an self-energizing force in the direction of the shift force for increasing the engagement force of the engaged friction surfaces.

4. The double acting synchronizer of claim 1, wherein:

the first end includes a third portion for disengaging the first and third friction surfaces prior to engagement of the second and fourth friction surfaces in response to the shift sleeve being moved by the shift force from a position having the third jaw teeth engaged and toward a position for engaging the fourth jaw teeth.

5. The double acting synchronizer of claim 4, wherein:

the second end includes a fourth portion for disengaging the second and fourth friction surfaces prior to engagement of the first and third friction surfaces in response to the shift sleeve being moved by the shift force from a position having the fourth jaw teeth engaged toward a position having the third jaw teeth engaged.

6. The double acting synchronizer of claim 1, wherein:

the first and second ends and the first and second friction rings include means for maintaining a rotational position therebetween and a limited rotational position relative to the hub.

7. The double acting synchronizer of claim 2, wherein:

the first end includes a third portion for disengaging the first and third friction surfaces prior to engagement of the second and fourth friction surfaces in response to the shift sleeve being moved by the shift force from a position having the third jaw teeth engaged and toward a position for engaging the fourth jaw teeth.

8. The double acting synchronizer of claim 7, wherein:

the posts are mounted for axial movement with and limited rotation relative to the shift sleeve, the posts include first self-energizing means engagable with second self-energizing means defined by the hub and operative when engaged to react the synchronizing torque for producing an self-energizing force in the direction of the shift force for increasing the engagement force of the engaged friction surfaces.

9. The double acting synchronizer of claim 2, wherein:

the second end includes a fourth portion for disengaging the second and fourth friction surfaces prior to engagement of the first and third friction surfaces in response to the shift sleeve being moved by the shift force from a position having the fourth jaw teeth engaged toward a position having the third jaw teeth engaged.

10. The double acting synchronizer of claim 2, wherein:

the first and second ends and the first and second friction rings include means for maintaining a rotational position therebetween and a limited rotational position relative to the hub.

11. The double acting synchronizer of claim 10, wherein:

the posts are mounted for axial movement with and limited rotation relative to the shift sleeve, the posts include first self-energizing means engagable with second self-energizing means defined by the hub and operative when engaged to react the synchronizing torque for producing an self-energizing force in the direction of the shift force for increasing the engagement force of the engaged friction surfaces.

12. The double acting synchronizer of claim 11, wherein:

the first end includes a third portion for disengaging the first and third friction surfaces prior to engagement of the second and fourth friction surfaces in response to the shift sleeve being moved by the shift force from a position having the third jaw teeth engaged and toward a position for engaging the fourth jaw teeth; and the second end includes a fourth portion for disengaging the second and fourth friction surfaces prior to engagement of the first and third friction surfaces in response to the shift sleeve being moved by the shift force from a position having the fourth jaw teeth engaged toward a position having the third jaw teeth engaged.

13. A double acting synchronizer for selectively synchronizing and positively connecting a shaft with either of axially spaced apart first and second drives disposed for relative rotation about an axis of the shaft and axially fixed relative thereto; the synchronizer comprising:

a hub affixed to the shaft concentric to the axis and between the drives;

first and second jaw teeth respectively affixed to the first and second drives;

first and second friction surfaces rotatably fixed respectively to the first and second drives;

a shift sleeve mounted for fixed rotation with and axial movement relative to the hub and having third and fourth jaw teeth respectively engagable with the first and second jaw teeth in response to a to-or-fro axial engaging movement of the shift sleeve from a neutral position by a shift force;

first and second friction rings respectively associated with the first and second drives and respectively having third and fourth friction surfaces respectively movable axially into engagement with the first and second friction surfaces for producing a synchronizing torque;

first blocker surfaces engagable with second blocker surfaces in response to the to-or-fro movement of the shift sleeve for preventing asynchronous engagement of the engagable jaw teeth and for transmitting the operator shift force across the engaged blocker surfaces to effect synchronizing engagement of the friction surfaces;

first and second self-energizing means operative when engaged to react the synchronizing torque for producing a self-energizing force in the direction of the shift force for increasing the engagement force of the engaged friction surfaces, the second self-energizing means mounted for axial movement with and limited rotation relative to the hub and defining the first blocker surfaces being operative to transmit the self-energizing force to the second blocker surfaces; and an axially extending rigid member (44) defining the second blocker surfaces (44r,44q,44s,44p) and including first and second ends (44c,44d) respectively having first and second portions (44f,4g) for transmitting the operator shift force and the self-energizing force to the first and second friction rings (40,42).

14. The double acting synchronizer of claim 13, wherein:

the first and second ends and the first and second friction rings include means for maintaining a rotational position therebetween and a limited rotational position relative to the hub.

15. The double acting synchronizer of claim 13, wherein:

the first end including a third portion for disengaging the first and third friction surfaces prior to engagement of the second and fourth friction surfaces in response to the shift sleeve being moved by the shift force from a position having the third jaw teeth engaged and toward a position having the fourth jaw teeth engaged.

16. The double acting synchronizer of claim 15, wherein:

the first and second ends and the first and second friction rings include means for maintaining a rotational position therebetween and a limited rotational position relative to the hub.

* * * * *